United States Patent [19]
Hodges

[11] Patent Number: 5,337,179
[45] Date of Patent: Aug. 9, 1994

[54] FLEXIBLE CONTROLLABLE OPTICAL SURFACE AND METHOD OF MAKING THE SAME

[76] Inventor: Marvin P. Hodges, 1565 Shadowglen Ct., Westlake Village, Calif. 91361

[21] Appl. No.: 920,206

[22] Filed: Jul. 27, 1992

[51] Int. Cl.$^5$ .............................................. G03B 21/56
[52] U.S. Cl. .................................... 359/443; 359/461
[58] Field of Search ................ 359/448, 443, 461, 885

[56] References Cited

U.S. PATENT DOCUMENTS

| | | | |
|---|---|---|---|
| 3,408,132 | 10/1968 | Chandler et al. | 350/125 |
| 3,897,140 | 7/1975 | Tuthill | 350/314 |
| 4,191,451 | 3/1980 | Hodges | 350/126 |

*Primary Examiner*—Richard A. Wintercorn
*Attorney, Agent, or Firm*—Fitch, Even, Tabin & Flannery

[57] ABSTRACT

A flexible optical surface, film or laminate using a non-rigid support substrate with a sufficient modulus of elasticity defining a controllable surface having a flat state so that repeatedly rolling-up the support substrate into a coiled state does not influence the flat state of the optical surface. The controllable surface can have one or more optical layers secured to the support substrate and use an optical pattern with predetermined optical characteristics to modulate incident light energy. One of the optical layers can be a reflective layer for forming a reflective controllable surface. The predetermined optical characteristic can modulate incident light energy to varying degrees such as by using a differential refraction or gain optical pattern according to the laws of optics.

53 Claims, 3 Drawing Sheets

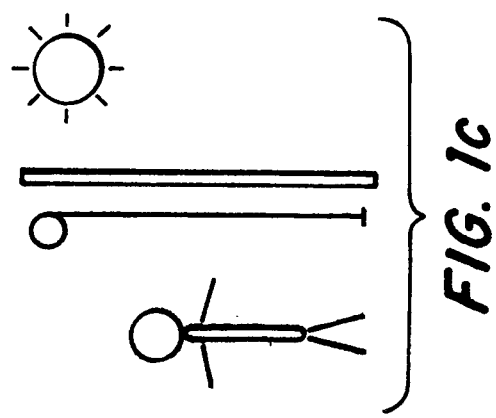
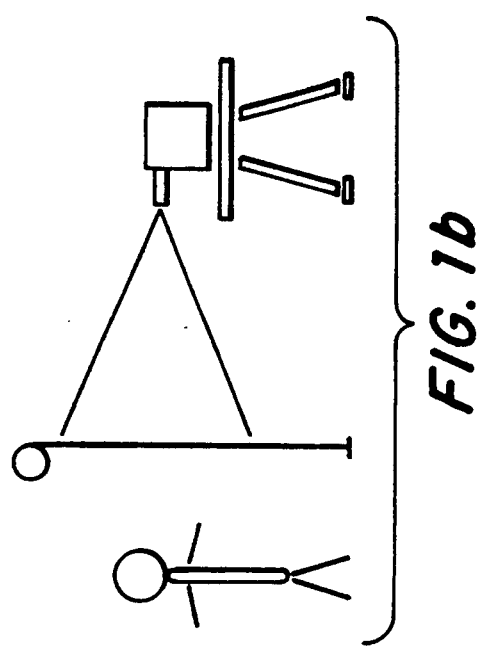
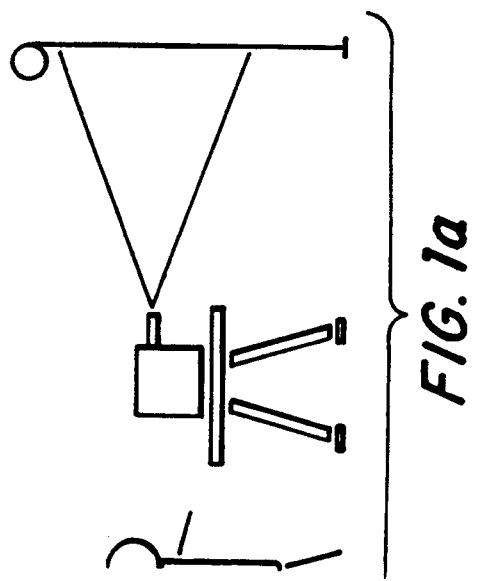
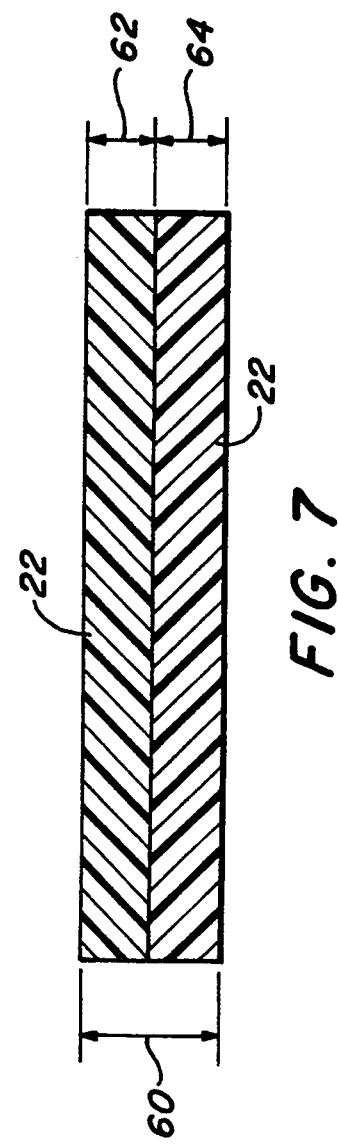

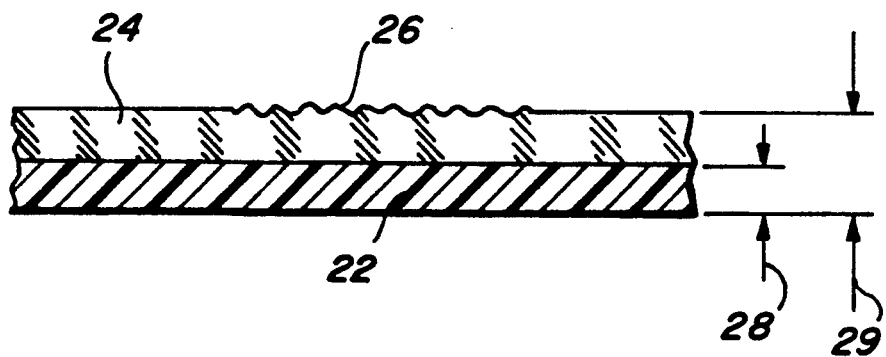
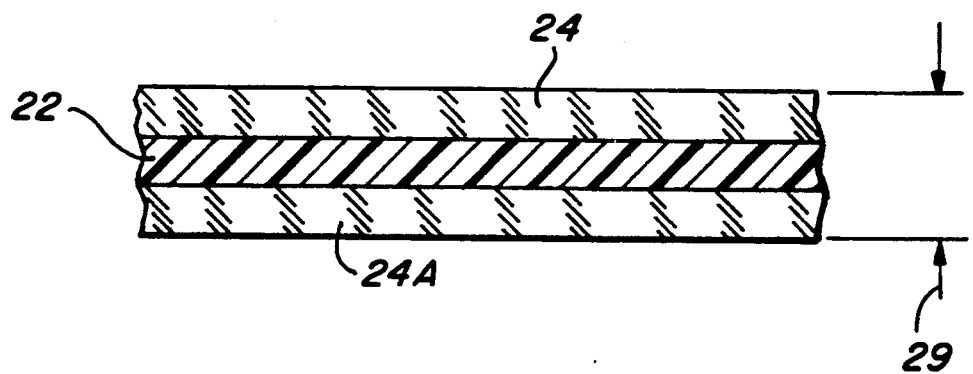
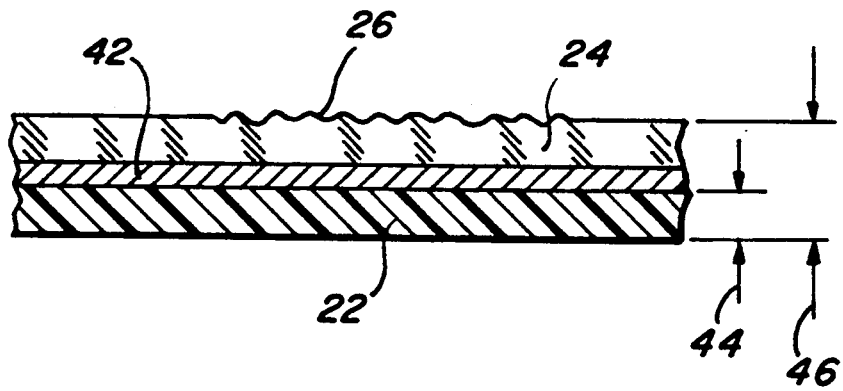

FLEXIBLE CONTROLLABLE OPTICAL SURFACE AND METHOD OF MAKING THE SAME

BACKGROUND OF THE INVENTION

1. Field of the Invention

This invention relates generally to flexible optical surfaces usable as filters, refractors, reflectors and the like, and more particularly to an improved controllable surface for optical applications with a flat state that is not influenced by repeatedly rolling and unrolling into a coiled state, and to a method for making the controllable surface.

2. Description of the Prior Art

An optical surface, film and laminate has optical applications in articles of manufacture ranging from a projector screen to a solar film. Various other optical applications include use in a television screen, highway reflector, sign or the like. For a desired application, the optical surface can be formed from a single substrate or from a wide variety of layered constructions. Some optical surfaces can be adapted with a precise optical characteristic or function to modulate incident light energy in accordance with the various laws of optics such as, for example, diffraction, diffusion, dispersion, refraction or reflection. The present invention provides both a controllable surface when unrolled, and permits the use of precision optical characteristics or functions. Furthermore, by forming the controllable surface using flexible, coilable spring-like materials having superior lay-flat characteristics, the present invention can be applied to many articles of manufacture that today use a rigid or non-rigid support substrate.

Some current designs of controllable surfaces use a rigid support substrate. The rigid support substrate is relatively stiff and thus can easily provide a predictable and usable planar surface area to define the controllable surface needed for optical applications. A spherically-curved rigid support substrate can be used to make the controllable surface more orthogonal to the incident light energy generated from a point source as is illustrated in U.S. Pat. No. 3,408,132 to Chandler et al., and thus can increase and control the light reflected to an audience viewing zone. The controllable surface formed using rigid support substrates can eliminate the problem of hot spotting as occurs with flat surfaces when the dynamic brightness range exceeds the tolerance of photopic vision. For example, in certain applications an optical pattern can be imprinted in or secured to the controllable surface to modulate incident light energy. The optical pattern can have the precision optical characteristic such as a differential refraction pattern to increase the dynamic range or gain of the optical surface. Patterns using multiple precision optical characteristics can also modulate incident light energy to a greater or lesser degree according to particular areas or zones of the optical surface. However, disadvantages of the rigid support substrate include storage problems where the rigid support substrate cannot be rolled-up and effectively transported. Other disadvantages include the optical surface being permanently secured to the rigid support substrate, being relatively bulky and unmovable, and requiring costly manufacture or installation.

Alternatively, known optical surfaces formed using a flexible or non-rigid support substrate cannot provide the controllable surface for optical applications requiring a pattern of precision optical characteristics because a non-uniform surface such as undulations, edge-curl or other surface deformations can negate the beneficial effects of the pattern. Most known non-rigid support substrates are manufactured from conventional polymeric materials such as nylons, vinyl, acetals, polyolefins, or other fiber reinforced materials with a modulus of elasticity of about 15,000 p.s.i. The resulting flexible optical surface can be rolled-up but does not have a controllable surface when unrolled. This feature of known non-rigid support substrates precludes the use of precise optical functions, particularly if the above-identified materials contain a plasticizer. For this reason, most applications for these optical surfaces using conventional non-rigid support substrates have not included precision optical characteristics or have reduced performance with restricted gains of 2 gains or less.

Projection screens are increasingly more diverse and sophisticated using precision optical characteristics, various combinations of optical patterns and a wide variety of layered constructions. An example of a projection screen is illustrated in U.S. Pat. No. 4,191,451, by the same inventor as the present application, and is hereby incorporated by reference. The patent relates to optical surfaces, and in particular to the forming of the optical layer for a multi-layered optical surface and method for manufacturing the same. The optical layer is formed with a pattern of light affecting elements to control the optical characteristics of the projection screen. The optical layer is secured to either a rigid or flexible support substrate made from conventional materials. However, the present invention overcomes the many disadvantages of known rigid and non-rigid support substrates made from conventional materials to provide a high gain, controllable surface using a non-rigid support substrate and precision optical characteristics.

Optical surfaces have applications in solar films. Solar films are mostly used to change the amplitude, magnitude or direction of incident light energy depending upon the application desired such as to reflect light energy in the summer or absorb light energy in the winter, or both. Known solar films are thin and flimsy requiring these to be permanently secured to a rigid support substrate such as glass in buildings, automobiles, etc. It would be advantageous if an all weather, relocatable roll-up solar film could be formed to function as a window shade and further to have precision optical characteristics incorporated thereon.

Accordingly, there is a need for a flexible optical surface, film or laminate with the advantages of the controllable surface with precision optical characteristics for such applications as roll-up projection screens. There is also a need for a simple, efficient and inexpensive method of producing these flexible optical surfaces to varied specifications. Such a method should be capable of producing high quality, superior controllable surfaces with optics at a reduced cost of manufacture.

SUMMARY OF THE INVENTION

It is an object of the present invention to provide a optical surface that overcomes many of the disadvantages of known flexible optical surfaces.

It is an object of the present invention to provide an optical surface using a support substrate made from flexible, stable material with an elasticity modulus between 300,000 and 600,000 p.s.i., and a thickness between 0.0015 and 0.018 inch thereby defining a planar or controllable surface. A feature of the flexible controllable surface provides good lay-flat properties which remain after repeatedly rolling into a coil and unrolling into the defined flat plane. An advantage of the present invention is increased applications in articles of manufacture requiring the flexible controllable surface and providing an effective means of transporting and storing the same.

Another feature of the flexible controllable surface as used in a roll-up projection screen having precision optical characteristics.

Another feature of the present invention is that the roll-up projection screen can have precise optical characteristics to control the dynamic range, gain or other optical characteristics to modulate efficiently incident light energy. An advantage of the present invention is the improved performance in a roll-up projection screen using precision optical characteristics and optical patterns. Another advantage of the roll-up projection screen is to increase the dynamic range and to vary the audience viewing zone of the screen by using a pattern having precision optical characteristics. Still yet another advantage is to make the roll-up projection screen with improved performance portable and thus easily relocatable.

Yet another object of the present invention is to provide an efficient solar film using varying transmissive properties of the support substrate and precision optical characteristics that can be rolled-up into a coil and unrolled to a flat state. It is a feature of the transmissive support substrate to be manufactured using dyes to absorb incident light energy and radiate heat. It is a feature of the solar film to use precision optical characteristics for affecting the amplitude, magnitude and direction of incident light energy. Another feature is that the solar film can be easily relocated for indoor or outdoor use. An advantage of the roll-up solar film is in having the portability and flexibility to move the solar film from room-to-room following high intensity light energy such as for seasonal changes. Another advantage of the roll-up solar film is the use as a window shade.

Still yet another object of the present invention is to provide a flexible optical surface having various combinations of predetermined precise optical characteristics to control and balance the optical properties of the optical surface. It is a feature of the present invention to use the optical pattern of precise optical characteristics in conjunction with the controllable surface such as dispersion optics or a differential optical pattern for modulating the brightness of on-axis incident light energy to a greater percentage than the brightness of off-axis incident light energy.

In brief, the present invention is directed to a flexible optical surface, film or laminate and method for making the same using a support substrate with both a sufficiently high modulus of elasticity to define accurately a controllable surface and a sufficiently low modulus of elasticity to permit the controllable surface to be repeatedly rolled into a coil and unrolled. An optical layer with precision optical characteristics can be extrusion cast or otherwise secured to the support substrate. The support substrate can have a modulus of elasticity from 300,000 p.s.i. to 600,000 p.s.i. and a thickness from 0.0015 to 0.018 inch. A reflective layer can be interposed between the support substrate and the optical layer. The optical layer can have precision optical characteristics or patterns such as to reflect, refract or otherwise modulate incident light energy. The support substrate can be formed by determining a required thickness for the support substrate and dividing the required thickness to form two segments of the support substrate. One segment is secured to the other segment by placing a side of the one segment having an inward curl to another side of the other segment also having an inward curl, where the inward curl of each segment is oriented in an opposite direction so as to place the inward curl of the one side opposite the inward curl of the other side, and thus negating the inward curl of each segment thereby forming the support substrate.

BRIEF DESCRIPTION OF THE DRAWINGS

These and other objects and advantages of the present invention will become readily apparent upon consideration of the following detailed description and attached drawings, wherein:

FIGS. 1a and 1b are schematic illustrations of an image projection system using a projection screen according to the present invention; and FIG. 1c is a schematic illustration of a solar film according to the present invention;

FIG. 2 is a cross-sectional view of one embodiment of the present invention illustrating the support substrate and an optical layer;

FIG. 3 is a cross-sectional view, similar to FIG. 2, illustrating another embodiment of the present invention;

FIG. 4 is a cross-sectional view of a reflector-type of optical laminate according to the present invention;

FIG. 7 is a cross-sectional view of another embodiment of the present invention illustrating a process of manufacturing the support substrate.

DETAILED DESCRIPTION OF THE PREFERRED EMBODIMENT

Figure 5A:
FIGS. 5a, 5b, 5c, 5d, 5e, 5f and 5g are enlarged schematic cross-sectional views illustrating an upper layer using a differential gain layer according to an embodiment of the present invention.

In accordance with the present invention, a flexible optical surface, film or laminate using a nonrigid support substrate and various optical layers is provided to affect incident light energy by means of an optical pattern with a precision optical characteristic or function. The flexible optical surface can be rolled into a coiled state and uncoiled returning to a flat state defining a planar or controllable surface. This controllable surface lacks a memory of the coiled state. In accordance with an important feature of the present invention, the support substrate is chosen to have a modulus of elasticity in the range from 300,000 p.s.i. to 600,000 p.s.i. and a thickness in the range from 0.0015 inch to 0.018 inch to provide the controllable surface with a sufficient usable surface area. Once the controllable surface is established, then subsequent optical layers can be secured thereto as needed for a particular application. The optical layer can include an optical pattern for establishing a precision optical characteristic as predetermined to modulate incident light energy in accordance with a designated application. The various features of the present invention will be described in both environments of a flexible projection screen and solar film but the present invention is not restricted solely to such as there are many articles of manufacture now using rigid and non-rigid support substrates which can benefit from the optical surface of the present invention.

One application for optical surfaces and films has been with image projection systems, for example, as roll-up front or rear projection screens illustrated in FIGS. 1a and 1b, respectively. The performance of such projection screens can be controlled by techniques such as increasing the dynamic range, restricting the audience viewing zone, and balancing the intensity of light energy across the projection screen as viewed by the audience member such as by using a gain optical layer. As above, conventional materials forming non-rigid support substrates heretofore could not be used to make high performance roll-up projection screens using a pattern with precision optical characteristics because the beneficial affects of the pattern to improve the dynamic gain and the projected image are negated by surface nonuniformities causing undesirable effects such as specularity, a shadowy image, hot spotting or light and dark zones. The disadvantage of surface non-uniformity results in roll-up projection screens that are restricted generally to a low optical gain such as of two gains or less. Other disadvantages restricting potential applications of conventional non-rigid support substrates as roll-up projection screens include the undesirable mechanical characteristics of a particular material such as the effects of temperature, instability, fragility, and hygroscopicity on the optical surface.

Referring now to FIG. 2-4, the optical surfaces shown generally as 20, 30 and 40 can be used for affecting incident light energy such as used in a refractive roll-up projection screen (FIGS. 1b, 2 and 3) and reflective roll-up projection screen (FIG. 1a and 4). The optical surfaces 20 includes a support substrate 22 and an optical layer 24. The materials used to form the support substrate 22 can have optical qualities such as being translucent, semi-translucent or opaque. The materials used to form the optical layer 24 can have similar optical qualities such as being translucent or semi-translucent. The support substrate 22 can be made from polymeric materials of a different chemical family or composition and elasticity modulus than the materials forming the optical layer 24. Each of the optical surfaces 20, 30 and 40 are now described in more detail.

Referring to FIG. 2, the optical surface 20 includes the support substrate 22 and the optical layer 24. The optical surface 20 can be used as a roll-up projection screen in FIGS. 1a and 1b. The support substrate 22 is formed from any polymeric material using an elasticity modulus between 300,000 and 600,000 p.s.i. and a substrate thickness 28 range between 0.0015 and 0.018 inch to provide a controllable surface with sufficient usable surface area that is flexible yet may be rolled into a coil. The optical layers 24 can be secured subsequently to the support substrate 22 to form an optical surface 20 with an overall thickness 29. In addition, the optical layer 24 can have a precision optical characteristic 26 as predetermined and formed from various optical patterns to modulate incident light energy. For example, as shown in FIGS. 5a and 6a, the precision optical characteristic 26 has optical properties to modulate light energy according to a differential dispersion function. Various patterns with precision optical characteristics 26 for the optical layer 24 are possible, as illustrated in FIGS. 5a through 5g and 6a through 6d, such as according to the law of diffraction, diffusion and dispersion as well as using other known techniques that are not shown.

In the preferred embodiment for a refractive roll-up projection screen functionally similar to the roll-up projection screen as shown in FIG. 1b, the flexible optical surface 20 uses the support substrate 22 with an elasticity modulus between 300,000 and 600,000 p.s.i.; a thickness between 0.0015 and 0.018 inch thus providing the controllable surface with sufficient usable surface area. Unlike a majority of known roll-up projection screens with elasticity modulus of approximately 15,000 p.s.i., suitable materials that exceed 200,000 p.s.i. cannot be readily embossed and thus the optical layers 24 must be separately applied to the support substrate 22, for example, as taught by my U.S. Pat. No. 4,191,451. Here, the optical layer 24 can be formed from thermally deformable plastics such as polyethylene. The optical layer 24 can be secured to the support substrate 22 using an extrusion casting technique. The extrusion casting technique can also be used to impart various patterns for the precision optical characteristics 26 using a casting cylinder.

An important feature of the present invention is to form the support substrate 22 with the controllable surface using a polymeric material within the specific elasticity modulus range. The modulus of elasticity of a particular material is measurable and expressed in pounds per square inch (p.s.i.). At a minimum, the support substrate 22 should have the modulus of elasticity of not less than 300,000 p.s.i. and thickness of not less than 0.0015 inch. For comparison, float gum rubber has high flexibility with a modulus of elasticity of 5000 p.s.i., whereas, glass has low flexibility with a modulus of elasticity of 8,000,000 p.s.i. Suitable polymeric films for forming the support substrate 22 are the polyethylenes, for example, polyethylene terephthalate (PET). Known suppliers for PET are the E.I. duPont deNemours and Company sold under the trade name Mylar; and the Kodak Corporation sold under the trade name Tetlar. In essence, the flexible optical surface 20 can be made from any number of combinations of polymeric materials with different thickness and elasticity modulus within the identified parameters.

Another parameter used as a consideration in designing the support substrate 22 of the present invention is the stiffness of a particular material. In general, as between discrete films, stiffness increases with the cube of the thickness. The overall stiffness of the support substrate 22 and subsequent memory or the spring-like quality of returning to the flat state defining the controllable surface is more a function of the elasticity modulus of a specific polymeric material. Furthermore, as the modulus of elasticity of a particular material increases, corresponding improvements occur in such properties as strain relief, thermal expansion, hygroscopic expansion and creep. Stiffness can be measured using a deflectometer constructed to measure grams of resistance to deflect a one square inch substrate sample a distance of 0.010 inch. Any reasonable optical flatness needed to form the controllable surface is achieved with not less than 800 grams of resistance. For example, the deflectometer measures approximately 800 grams of resistance for the substrate thickness 28 of 0.007 inch, 3200 grams of resistance for 0.01 inch thickness, and 8300 grams of resistance for a 0.014 inch thickness keeping a constant elasticity modulus of 500,000 p.s.i. As a design consideration, depending on the ultimate number of optical layers and desired application, the support substrate 22 should be dimensionally thicker than the optical layer 24 so as to assume the mechanical characteristics of the support substrate 22. Also, dependent upon the precision optical characteristic 26 as designated by a particular application, different substrate thickness 28 and elasticity modulus for the support substrate 22 can be used to form the roll-up projection screen. For each improvement of the above-identified properties, the particular material becomes more suitable for certain applications such as outdoor use.

For example, to illustrate these features, if the polymeric material used for the support substrate 22 has a modulus of elasticity of about 500,000 p.s.i., then flexibility can be maintained up to a thickness of about 0.018 inch, beyond which the support substrate 22 becomes excessively rigid. As a modulus of elasticity decreases, a corresponding increase in thickness is needed to maintain the desired stiffness. Similarly, a minimum thickness of about 0.0015 inch and elasticity modulus of about 500,000 p.s.i., the support substrate 22 has a stiffness value sufficient to provide the controllable optical surface of about 30 square inches. Increasing the thickness to about 0.008 inch also increases the useful controllable optical surface to more than 120 square inches. For optical surfaces intended for applications involving optical coatings, it is recommended that the non-rigid support substrate have a minimum thickness of 0.0075 inch for any area. Finally, in most roll-up applications it is recommended that the support substrate have a maximum thickness of 0.018 inch. Thus the roll-up projection screen of the present invention can overcome numerous disadvantages of known flexible support substrates, for example, undulations or warping caused by retaining undesirable nonuniformities introduced by rolling and unrolling the support substrate and by their inherent flexibility.

Referring now to FIG. 3, wherein similar elements will be designated using the same numerals, the optical layers 24 and 24a can be applied to both of the exposed upper and lower surfaces of the support substrate 22 to form the optical surface 30. In the optical surface 30, the support substrate 22 can take many forms such as being translucent or being semi-translucent as to have dyes dispersed within the polymeric material of the support substrate 22 or can further have dispersion fillers disposed within the support substrate 22 as are known in the art. By applying an additional support substrate 24a, the optical surfaces 30 or 40 can be protected from external contaminates and degrading factors such as dust, microorganisms or the adverse effects of extreme weather conditions for increased longevity and durability.

Referring now to FIG. 4, wherein similar elements will be designated using the same numerals, a reflective optical surface 40 can be used to form the reflective projection screen shown in FIG. 1a. The reflective optical surface 40 has the support substrate 22 and optical layer 24 with precision optical characteristics 26, and additionally includes a reflective layer 42. In the reflective screen of FIG. 1a, the support substrate 22 can be selected to have a modulus of elasticity within the range from 300,000 p.s.i. to 600,000 p.s.i.; and a thickness 44 from 0.0015 to 0.018 inch. The reflective layer 42 with a thickness dimension of less than 0.0005 inch can be formed of metal such as a thin reflective foil, for example, pack-rolled aluminum foil with an exposed matte surface, a deposited metal layer or by using other methods and known techniques. The reflective layer 42 using the thin pack-rolled reflective foil with a matte surface has particular advantages in that the matte surface has microscopic ridges causing dispersion that can be used to control specularity with a gain ratio of 2:1. An example of a reflective layer 42 formed from a thin aluminum foil with a matte surface for use in the projection screen is illustrated in U.S. Pat. No. 3,408,132 to Chandler et al. The matte surface has a random pattern of elongated irregularities forming an accurate surface pattern. The reflective layer 42 can be secured to the support substrate 22 using known techniques such as by adhesives. The thin reflective layer 42 will assume the mechanical characteristics of the support substrate 22. The optical layer 24 with a thickness dimension of greater than 0.002 inch can be secured to the now one layer comprised of the reflective layer 42 and support substrate 22 using extrusion casting or other techniques known in the art. The matte surface as well as other known techniques are used to improve the performance of the projection screen. However, as used in the present invention, the non-rigid support substrate 22 forms a controllable surface allowing for the use of precision optical characteristics that were once reserved for rigid support substrates.

Referring now to FIGS. 2-4, solar films using the support substrate 22 of the present invention will now be described. A solar film can be made using the same techniques and construction described for the optical surfaces 20, 30 and 40. In a preferred construction, the solar film forms an optical surface with a total modulus of elasticity of 500,000 p.s.i. to provide sufficient support, durability, strength and other beneficial features for indoor and outdoor applications. Furthermore, the thickness of the solar film can be between 0.003 and 0.018 inch which can include the support substrate 22 and subsequent layers such as the optical layer 24 and any reflective layers 42. The solar film can have a support substrate 22 and optical layer 24 of a combined thickness between 0.0015 and 0.006 inch. The optical layer 24 can be formed to control the transmissive value of incident light energy by absorbing energy and radiating heat such as by using a dye dispersed therein, differential gain layer or partially reflective layer. The solar film is not limited to one support substrate 22 and additional support substrates 24a can be used to provide a seal for the optical layers 24 and thus to provide protection from external contaminates. As shown in FIG. 1c, the relocatable solar film could be relocated at will, for example, put on the outside or inside of the window or selectively moved to different areas of high sunlight. Alternatively, the relocatable solar film could be rolled up such as on a cloudy day or lowered for increased privacy.

The support substrate 22 can also have a precision optical characteristic 26, for example, a specific transmissive value can be used. The transmissive value of the support substrate 22 allows more or less light energy to pass through optical surface. The transmission value can be controlled by using a dye introduced into the support substrate 22 at the time of manufacture or by other methods as are known in the art. The reflective layer 42 can also vary the transmission value and can be made partially reflective using reflective particles deposited on or dispersed in the support substrate 22, such as according to the principle of a half-silvered mirror. A partially-reflective reflective layer 24 can provide the appropriate optical characteristic for various applications. The reflective layer 42 can be protected by an additional support substrate 22 as well, or by using an optical layer 24 wherein the thickness and modulus of elasticity falls within the above-identified range.

Figure 5B:
Figure 5C:
Figure 5D:
Figure 5E:
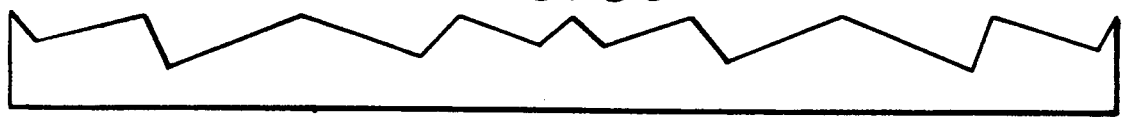
Figure 5F:
Figure 5G:
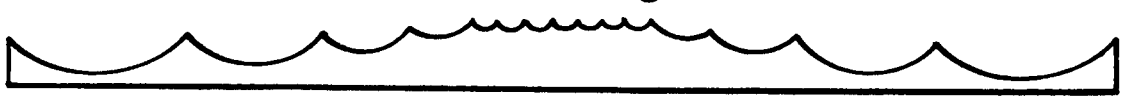
Figure 6A:
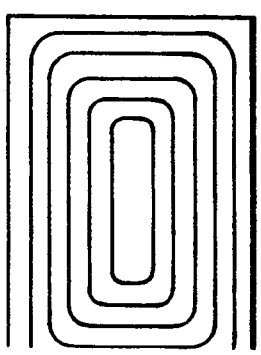
FIGS. 6a, 6b, 6c and 6d are reduced schematic front plan views illustrating the upper layer using a differential gain layer according to an embodiment of the present invention.
Figure 6B:
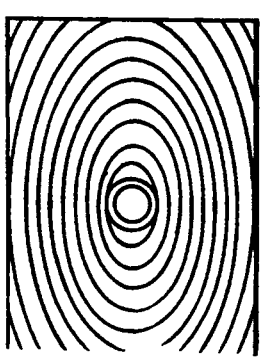
Figure 6C:
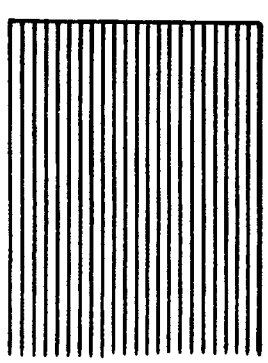
Figure 6D:
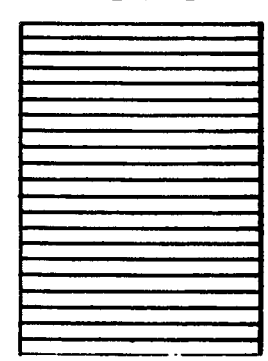

Referring now to FIGS. 5a through 5g, various patterns for the optical layer 24 showing patterns with precision optical characteristics 26 can be formed such as with a differential refraction, reflection or dispersion optical patterns. As shown in FIGS. 5a and 5b, a dispersion pattern can be formed in the optical layer 24. The dispersion pattern can reduce problems of hot spotting and redistribute incident light energy in either refractive or reflective projection screens or solar films. As applied in solar films, the redistribution of light energy such as ultra-violet or infrared light energy can change the amplitude, magnitude or direction of incident light energy. Other pattern with precision optical characteristics 26 designs are illustrated in FIGS. 5c, 5d, 5e, 5f and 5g. The optical layer 24 can have additional patterns possible for a desired application as are known in the art.

As illustrated in FIGS. 6a, 6b, 6c and 6d, various plan views of the layers 24 for the optical surfaces 20, 30 and 40 are shown. The patterns shown in FIGS. 6a and 6b can be used to redirect incident light energy such as to control an audience viewing zone or to uniformly redistribute sunlight incident on a solar film. The patterns shown in FIGS. 6a and 6b can also be used to redirect incident light energy such as by a fresnel lens. The patterns shown in FIGS. 6c and 6d can be used for various applications to redistribute light according to a precision optical characteristic 26 such as a diffraction grating.

Referring to FIG. 7, a method of forming the optical surfaces 20, 30 or 40 is provided to neutralize inherent edge-curls and other surface non-uniformities. Typically, manufacturers of high elasticity modulus polymeric films for forming the support substrate 22 deliver these films on master rolls in various dimensions and thickness. When the master roll is unrolled and cut to a desired size, these high elasticity modulus films have an inherent manufactured tendency to curl toward an inward surface of the master roll. One method to eliminate the curl is to halve substrate thickness 60 forming thickness 62 and 64. Each half thickness 62 and 64 forming support substrate 22 are bonded together using a counter-balancing technique where each inward surface is bonded to another inward surface in opposite directions such as, for example, having the inward surface of each half thickness placed face-to-face or back-to-back. By using this process, the optical surface 20, 30 or 40 can have increased usable controllable surface area and achieve flatness while reducing inherent curl.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An optical laminate comprising:
   a support substrate defining an optical surface, said support substrate having a sufficiently high modulus of elasticity to define accurately said optical surface and a sufficiently low modulus to permit said support substrate to be rolled into a coil; and
   an optical layer secured to said support substrate, said optical layer having a predetermined optical characteristic.

2. The optical laminate of claim 1, wherein said support substrate has a modulus of elasticity from 300,000 p.s.i. to 600,000 p.s.i.

3. The optical laminate of claim 2, wherein said support substrate has a thickness from 0.0015 to 0.018 inch.

4. The optical laminate of claim 3, wherein said support substrate is formed from polyethylene terephthalate (PET).

5. The optical laminate of claim 1, wherein said optical layer is a thermoplastic.

6. The optical laminate of claim 5, wherein said optical layer is secured to an upper surface of said support substrate by extrusion casting, said extrusion casting forming said predetermined optical characteristic on said optical layer.

7. The optical laminate of claim 5, wherein said optical layer is secured to an upper and a lower surface of said support substrate by extrusion casting, said extrusion casting forming said predetermined optical characteristic on said optical layer.

8. The optical laminate of claim 1, wherein said predetermined optical characteristic is a refractive pattern for refracting said incident light energy.

9. The optical laminate of claim 1, wherein said predetermined optical characteristic is a differential dispersion pattern for differentially refracting off-axis incident light energy to a greater angle than on-axis incident light energy.

10. An optical laminate of claim 1, further comprising:
    a reflective layer interposed between said support substrate and said optical layer for reflecting said incident light energy.

11. A projection screen comprising:
    a support substrate having a modulus of elasticity so that said support substrate has a planar surface defining a flat state, and said flat state is not influenced by repeated windings to a coiled state; and
    an optical layer secured to said support substrate.

12. The projection screen of claim 11, wherein said support substrate has a modulus of elasticity of from 300,000 p.s.i. to 600,000 p.s.i.

13. The projection screen of claim 12, wherein said support substrate has a thickness from 0.0015 to 0.018 inch.

14. The projection screen of claim 13, wherein said support substrate is polyethylene terephthalate (PET).

15. The projection screen of claim 11, wherein said optical layer is made from a thermoplastic and is extrusion casted.

16. The projection screen of claim 15, wherein said extrusion casting of said optical layer imprints an optical pattern on said optical layer.

17. The projection screen of claim 16, wherein said optical pattern controls the degree of diffusion of incident light energy across said projection screen.

18. The projection screen of claim 17, wherein said pattern differentially modulates a distribution of said incident light energy across the surface of the projection screen by diffusing the brightness of on-axis incident light energy by a greater percentage than the brightness of off-axis light energy.

19. The projection screen of claim 11, further comprising:

a reflective layer interposed between said optical layer and said support substrate.

20. The projection screen of claim 19, wherein said reflective layer is a metal foil such as aluminum.

21. An optical screen comprising:
a support substrate having a flat state with a memory wherein said memory returns said support substrate to said flat state after repeated windings to a coiled state; and
at least one optical layer secured to said support substrate.

22. The article of claim 21, wherein said support substrate has a modulus of elasticity of not less than 300,000 p.s.i. and not greater than 600,000 p.s.i. and a thickness of not less than 0.0015 inch and not greater than 0.018 inch.

23. The article of claim 22, wherein said support substrate is polyethylene terephthalate (PET).

24. The article of claim 21, wherein said optical layer is polyethylene.

25. The article of claim 21, wherein said optical layer modulates incident light energy according to a predetermined refractive pattern.

26. The article of claim 21, wherein said optical layer differentially modulates the amplitude and magnitude of said incident light energy from a center point to an outer edge point of the article, said differential modulation refracts said incident light energy located at said outer edge point to a greater degree than said center point.

27. The article of claim 21, further comprising:
a reflective layer secured to said optical layer, said reflective layer interposed between said support substrate and said optical layer.

28. The article of claim 27, wherein said optical layer modulates said incident light energy according to a predetermined reflective pattern.

29. A solar film having one or more layers for affecting incident light energy, comprising:
a support substrate providing a flat plane, said support substrate having a modulus of elasticity so that said flat plane can be rolled into a coil; and
at least one optical layer secured to said support substrate, wherein said support substrate and said optical layer has a total modulus of elasticity exceeding 300,000 p.s.i.

30. The solar film of claim 29, wherein said support substrate and said optical layer of said solar film have a combined thickness from 0.0015 to 0.006 inch.

31. A solar film having one or more layers for affecting incident light energy, comprising:
a support substrate providing a flat plane, said support substrate having a modulus of elasticity so that said flat plane can be rolled into a coil; and
at least one optical layer secured to said support substrate, wherein said optical layer absorbs energy and radiates heat, said optical layer being a differential gain layer for controlling a transmissive value of the incident light energy.

32. The solar film of claim 31, wherein the transmissive value of said incident light energy is achieved by a dye, said dye being introduced into the support substrate and/or the optical layer.

33. A solar film having one or more layers for affecting incident light energy, comprising:
a support substrate providing a flat plane, said support substrate having a modulus of elasticity so that said flat plane can be rolled into a coil;
at least one optical layer secured to said support substrate; and
a reflective layer interposed between said support substrate and said optical layer for reflecting said incident light energy, said incident light energy being reflected in a pattern according to a predetermined optical function of said optical layer.

34. The solar film of claim 33, wherein said reflective layer is a metal foil such as aluminum.

35. The solar film of claim 33, wherein said reflective layer is a partially transmissive layer.

36. The solar film of claim 35, wherein said partially transmissive layer is by means of metal particles introduced into said optical affecting layer or by means of a partial-silvered reflective layer.

37. A process of manufacturing an optical laminate comprising:
forming a support substrate from a material having a modulus of elasticity not less than 300,000 p.s.i. and not greater than 600,000 p.s.i., and having a thickness of not less than 0.0015 inch;
applying one or more optical layers having an optical pattern in said optical layer on said support substrate;
said optical lamination application having an overall modulus of elasticity from 300,000 p.s.i. to 600,000 p.s.i. and an overall thickness less than 0.018 inch.

38. The optical laminate made by the process of claim 37.

39. The process of claim 37, further comprising the step of:
adding a reflective layer, said reflective layer being interposed between said support substrate and said upper layer, and said reflective layer reflecting incident light energy.

40. The optical laminate made by the process of claim 39.

41. The process of claim 37, wherein said step of forming said support substrate further comprising the steps of:
determining a required thickness for said support substrate and dividing said required thickness to form two segments of the support substrate;
securing a side of one of said segments having a curl to another side of said other segment having a curl, wherein said curl of one side of said segment is oriented in an opposite direction as to said curl of the other side of said other segment so as to negate the curl of each segment thereby forming said support substrate.

42. The optical laminate made by the process of claim 41.

43. The process of claim 41, further comprising the step of:
securing a reflective layer to said support substrate, said reflective layer being interposed between said support substrate and said upper layer, and said reflective layer reflecting incident light energy.

44. The optical laminate made by the process of claim 43.

45. A flexible image display surface comprising:
a support substrate;
a reflective layer on said support substrate having a matte surface; and
an optical layer on said matte surface of said reflective layer, said optical layer having a thickness greater than said reflective layer and a stiffness less than said support substrate.

46. The image display surface of claim 45 wherein said image display surface has a combined thickness greater than 0.003.

47. The image display surface of claim 45 wherein the optical layer has a thickness greater than 0.002 inch.

48. The image display surface of claim 45 wherein said reflective layer has a thickness less than 0.0005 inch.

49. The image display surface of claim 45 wherein said matte surface of said reflective layer is formed of pack rolled aluminum foil.

50. The image display surface of claim 45 wherein said support substrate has a modulus of elasticity greater than 300,000 p.s.i.

51. A flexible optical surface comprising:
two or more layers for affecting incident light energy, said two or more layers include a lower layer formed from a polymeric material of a first chemical family and elasticity modulus and an upper layer formed from a polymeric material of a second chemical family and elasticity modulus, said upper layer being secured to said lower layer, and wherein said first chemical family and elasticity modulus is different than said second chemical family and elasticity modulus.

52. The flexible optical surface of claim 51, wherein said elasticity modulus of said lower layer being in excess of 300,000 p.s.i.

53. A flexible optical surface comprising:
three or more layers for affecting incident light energy, said layers including a first layer having a modulus of elasticity greater than 300,000 p.s.i., a second layer formed from a packed-rolled aluminum foil and secured to said first layer, and a third layer formed from a thermal formable polymeric film, wherein said third layer is secured to either of said first or second layers.

* * * * *